United States Patent
Ewert

(10) Patent No.: US 10,395,387 B2
(45) Date of Patent: Aug. 27, 2019

(54) METHOD AND APPARATUS FOR DETECTING A UTILIZATION OF AN ELECTRONIC DEVICE BY A DRIVER, FOR A VEHICLE

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 15/480,699

(22) Filed: Apr. 6, 2017

(65) Prior Publication Data

US 2017/0316581 A1 Nov. 2, 2017

(30) Foreign Application Priority Data

Apr. 29, 2016 (DE) .................. 10 2016 207 353

(51) Int. Cl.
*G06K 9/00* (2006.01)
*G06T 7/73* (2017.01)
*B60K 28/02* (2006.01)

(52) U.S. Cl.
CPC ............... *G06T 7/74* (2017.01); *B60K 28/02* (2013.01); *G06K 9/00362* (2013.01); *G06K 9/00375* (2013.01); *G06K 9/00597* (2013.01); *G06K 9/00845* (2013.01); *G06T 2207/10004* (2013.01); *G06T 2207/10028* (2013.01);
(Continued)

(58) Field of Classification Search
CPC ... G06T 7/74; G06T 7/70; G06T 2207/10004; G06T 2207/10028; G06T 2207/10132; G06T 2207/30196; G06T 2207/30248; G06T 2207/30268; B60K 28/02; G06K 9/00362; G06K 9/00375; G06K 9/00597; G06K 9/00845; G06K 9/00832; G06K 9/00221; H04M 1/72577; H04M 1/66; H04M 1/6075; H04M 1/72569; H04M 2250/12; B60W 2050/0077; B60W 30/08; H04W 4/027; H04W 48/02; B60R 16/0232; B60R 21/01; B60R 21/015; B60R 2021/01204; G08G 1/096716; G08G 1/09675; H04N 5/217; H04N 5/222; H04K 3/415; H04L 67/24
See application file for complete search history.

(56) References Cited

U.S. PATENT DOCUMENTS 9,338,605 B2 * 5/2016 Guba .................... H04W 4/027
9,398,421 B2 * 7/2016 Guba .................... H04W 4/027
(Continued)

*Primary Examiner* — Jose L Couso
(74) *Attorney, Agent, or Firm* — Norton Rose Fulbright US LLP; Gerard Messina

(57) ABSTRACT

A method includes a reading-in step in which at least one sensor signal is read in via an interface to a sensor disposed in the vehicle, the sensor signal representing at least one current parameter of the electronic device and/or of the driver in the vehicle. The method furthermore includes a comparing step in which the sensor signal is compared with at least one stored utilization signal that represents a utilization of the electronic device by the driver while driving the vehicle. The method further includes an outputting step in which a detection signal is outputted if a predetermined correlation exists between the sensor signal and the utilization signal, in order to indicate the detected utilization of the electronic device.

20 Claims, 2 Drawing Sheets

(52) U.S. Cl.
CPC .............. *G06T 2207/10132* (2013.01); *G06T 2207/30196* (2013.01); *G06T 2207/30268* (2013.01)

(56) References Cited

U.S. PATENT DOCUMENTS

| | | | | |
|---|---|---|---|---|
| 10,127,810 | B2* | 11/2018 | Durie, Jr. | G08G 1/205 |
| 2009/0085728 | A1* | 4/2009 | Catten | H04K 3/415 |
| | | | | 340/425.5 |
| 2010/0210254 | A1* | 8/2010 | Kelly | G07C 5/008 |
| | | | | 455/418 |
| 2010/0216509 | A1* | 8/2010 | Riemer | H04M 1/72577 |
| | | | | 455/557 |
| 2011/0269441 | A1* | 11/2011 | Silver | H04W 4/027 |
| | | | | 455/418 |
| 2013/0210406 | A1* | 8/2013 | Vidal | H04W 4/00 |
| | | | | 455/418 |
| 2015/0054639 | A1* | 2/2015 | Rosen | G06K 9/00785 |
| | | | | 340/439 |
| 2016/0044575 | A1* | 2/2016 | Rajeevalochana | H04W 4/027 |
| | | | | 455/410 |
| 2016/0105840 | A1* | 4/2016 | Smiley | H04W 48/04 |
| | | | | 455/418 |
| 2017/0075740 | A1* | 3/2017 | Breaux | G06F 9/546 |
| 2017/0201619 | A1* | 7/2017 | Cohen | H04M 1/72569 |
| 2017/0279957 | A1* | 9/2017 | Abramson et al. | |
| | | | | H04M 1/72577 |
| 2018/0070290 | A1* | 3/2018 | Breaux | H04W 76/14 |
| 2018/0329765 | A1* | 11/2018 | Breaux | G06F 9/546 |
| 2018/0341534 | A1* | 11/2018 | Breaux | H04W 4/40 |
| 2019/0037067 | A1* | 1/2019 | Cohen | H04M 1/6075 |
| 2019/0052747 | A1* | 2/2019 | Breaux | H04M 1/72577 |

* cited by examiner

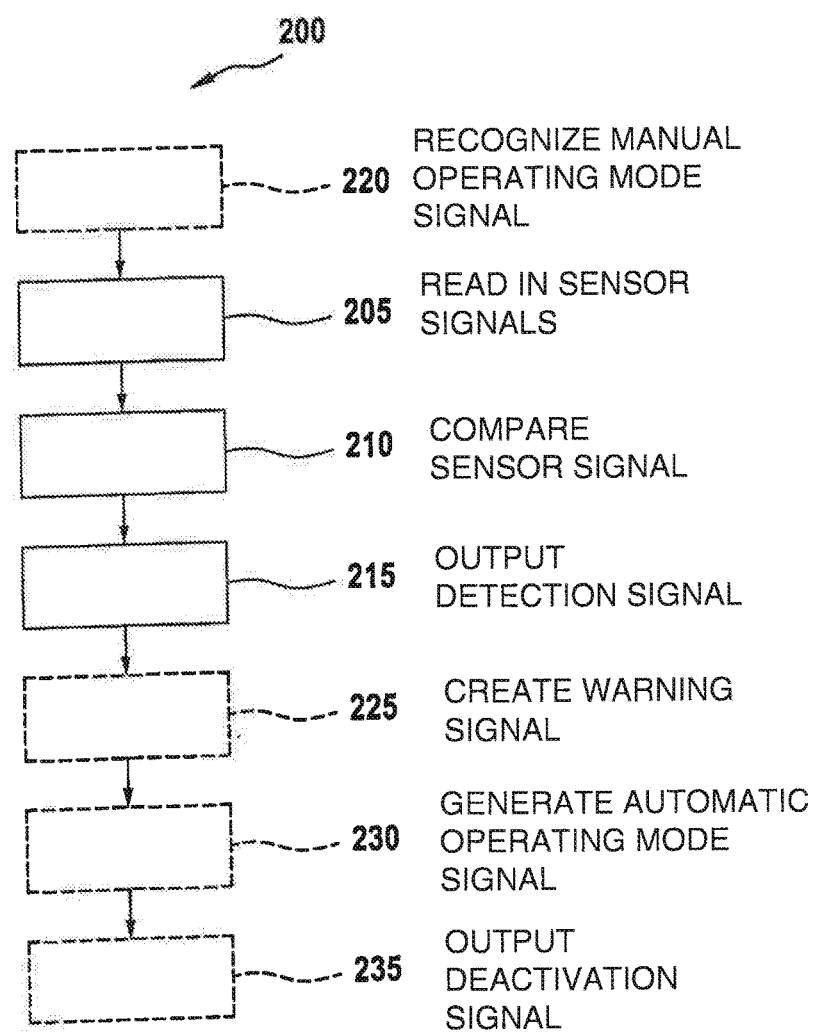

METHOD AND APPARATUS FOR DETECTING A UTILIZATION OF AN ELECTRONIC DEVICE BY A DRIVER, FOR A VEHICLE

CROSS-REFERENCE TO RELATED APPLICATIONS

The present application claims priority under 35 U.S.C. § 119 to DE 10 2016 207 353.2, filed in the Federal Republic of Germany on Apr. 29, 2016, the content of which is hereby incorporated by reference herein in its entirety.

FIELD OF THE INVENTION

The present invention relates to methods and devices for restricting a driver's use of certain electrical devices while driving.

BACKGROUND

Utilization of an electronic device, such as a mobile telephone, while driving a car can increase the risk of an accident by more than 20 times. Someone driving on a main road at 60 mph who is inattentive for only one second, for example, travels 27 meters while "flying blind." This is long enough, for example, to drive into a tree. According to a survey by DEKRA, one in every five car drivers utilizes the driver's mobile telephone while driving.

SUMMARY

In order to avoid the aforesaid hazards, it is advantageous to suppress, during driving, all functions of electrical devices which negatively affect traffic safety. In light of the above, what is presented with the approach presented here is a method for detecting a utilization of an electronic device by a driver, for a vehicle; an apparatus that uses that method; and a corresponding computer program.

According to an example embodiment of the present invention, a method for detecting a utilization of an electronic device by a driver of a vehicle includes a reading-in step in which at least one sensor signal is read in via an interface to a sensor disposed in the vehicle. The sensor signal represents at least one current parameter of the electronic device and/or of the driver in the vehicle. The method furthermore includes a comparing step in which the sensor signal is compared with at least one stored utilization signal that represents the utilization of the electronic device by the driver while driving the vehicle. The method further includes an outputting step in which a detection signal is outputted if a predetermined correlation exists between the sensor signal and the utilization signal, in order to detect the utilization of the electronic device.

Advantages achievable with the approach presented include that utilization of the device can be ascertained unequivocally, or at least very reliably, by way of the stored utilization signals and the comparison of those utilization signals with current sensor signals while driving. Ideally, for this purpose utilization signals of a wide variety of types can be stored for the comparison. In the outputting step, the detection signal can advantageously be outputted when the sensor signal conforms to the utilization signal within a tolerance range. The tolerance range can encompass, for example, a range of a 10 or 20 percent deviation of the sensor signal from the utilization signal. Countermeasures can then be initiated, for example, in response to the detection signal.

According to an embodiment, in the reading-in step, the sensor signal can be read in as a camera signal furnished by a vehicle camera, an ultrasonic signal furnished by an ultrasonic sensor, and/or a laser signal, in particular a three-dimensional laser image signal, furnished by a laser scanner. It is furthermore advantageous when, in the comparing step, the stored utilization signal is compared as an image signal, an ultrasonic image signal, and/or a laser image signal, in particular a three-dimensional laser image signal. A conformity of the sensor signal with the utilization signal can be detected quickly and reliably based on an image comparison.

For this, in the reading-in step, a parameter that represents a position, a gaze direction, and/or a hand movement of the driver in the vehicle can be read in. The aforesaid parameters can represent typical behaviors when utilizing the device, for example a downwardly directed gaze direction of the eyes, a typing motion, and/or a swiping movement of a hand, as is typical when scrolling on a smartphone display.

In the reading-in step, the sensor signal can additionally or alternatively be read in as a seat signal furnished by a seat sensor. In this context, a parameter that represents a posture of the driver on the seat can be read in the reading-in step. The parameter can be, for example, a bent-over posture. In the comparing step, the stored utilization signal can correspondingly be compared as a posture image signal.

It is furthermore advantageous if, in the reading-in step, the sensor signal is read in as a coupling signal furnished by a coupling device, a parameter that represents a radio-based and/or wired coupling connection of the device to at least one component of the vehicle in the vehicle in particular being read in the reading-in step. In the comparing step, the stored utilization signal can correspondingly be compared as a disconnected radio-based and/or wired coupling connection of the device to the component of the vehicle in the vehicle. For example, the detection signal can be outputted as soon as the device is disconnected from the coupling connection, which for example can be a charging station, since it can be assumed in this context that the device is being disconnected from the coupling connection by the driver in order to utilize the device.

Additionally or alternatively, in the reading-in step, the sensor signal can be read in as a device signal furnished by a device sensor of the device. Advantageously, a parameter that represents a movement, acceleration, and/or rotation rate of the device in the vehicle can be read in. Because the device is at least slightly moved/rotated by the user during utilization, the aforesaid parameters can be useful for detecting utilization.

Because utilization of, for example, a mobile telephone by the driver while driving is prohibited by law in some countries, in the outputting step, the detection signal can be outputted to a receiver unit disposed externally from the vehicle, for example to an authority such as the police, in order to report the commission of the offense.

Alternatively, or in order to warn the driver beforehand, in accordance with an embodiment the method can encompass a creating step in which an acoustic and/or optical warning signal is created in response to the detection signal.

The method can advantageously also have a generating step in which an automatic operating mode signal, for transferring the vehicle into a partly or highly automated driving mode, is generated in response to the detection signal. A "partly or highly automated driving mode" can be understood as an operating mode of the vehicle in which the vehicle is guided along a road or a driving route at least partly without interaction or control by a driver of the vehicle. The driver can thus utilize the device while the vehicle can continue to be driven safely in highly automated fashion.

According to an embodiment, the method can furthermore encompass a recognizing step in which a manual operating mode signal, which represents a manual driving mode of the vehicle, is recognized. The reading-in step can advantageously be executed in response to the recognizing step, so that the detection signal can be outputted only if a utilization of the device in the manual driving mode is recognized, since utilization of the device in the partly or highly automated driving mode does not represent a hazard. A "manual driving mode" can be understood as an operating mode of the vehicle in which the vehicle is, for example, manually controlled by a driver.

In order to allow any danger resulting from distraction of the driver by the device to be precluded, the method can also have a deactivating step in which a deactivation signal, which is configured to deactivate the device, is outputted in response to the detection signal.

This method can be implemented, for example, in software or hardware or in a mixed form of software and hardware, for example in a control device.

According to an example embodiment, an apparatus is configured to carry out, activate, or implement the steps of a variant of a method described herein in corresponding devices. This variant embodiment of the approach in the form of an apparatus also allows the object on which the approach is based to be achieved quickly and efficiently.

For this, the apparatus can have at least one computation unit for processing signals or data, at least one memory unit for storing signals or data, at least one interface to a sensor or to an actuator for reading in sensor signals from the sensor or for outputting data signals or control signals to the actuator, and/or at least one communication interface for reading in or outputting data that are embedded in a communication protocol. The computation unit can be, for example, a signal processor, a microcontroller, or the like, and the memory unit can be a flash memory, an EPROM, or a magnetic memory unit. The communication interface can be configured to read in or to output data wirelessly and/or in wire-based fashion, and, for example, can read in those data from a corresponding data transfer line or output them into a corresponding data transfer line, for example, electrically or optically.

An "apparatus" can be understood herein as an electrical device that processes sensor signals and outputs control signals and/or data signals as a function thereof. The apparatus can have an interface that can be configured in hardware- and/or software-based fashion. With a hardware-based configuration, the interfaces can be, for example, part of a so-called "system ASIC" that contains a wide variety of functions of the apparatus. It is also possible, however, for the interfaces to be dedicated integrated circuits or to be made up at least partly of discrete components. With a software-based configuration, the interfaces can be software modules that are present, for example, on a microcontroller alongside other software modules.

In an advantageous embodiment, an apparatus controls a detection signal. The apparatus can access for this purpose, for example, signals such as a sensor signal and a utilization signal. Control via actuators occurs, for example, implementing an interface, a comparison unit, and a detection device.

Also advantageous is a computer program product or computer program having program code, which can be stored on a machine-readable medium or storage medium such as a semiconductor memory, a hard drive memory, or an optical memory, and which is used to carry out, implement, and/or activate the steps of the method according to one of the embodiments described herein, in particular when the program product or program is executed on a computer or an apparatus.

Example embodiments of the present invention are depicted in the drawings and explained in further detail in the description that follows.

BRIEF DESCRIPTION OF THE DRAWINGS

FIG. 2 is a flowchart that illustrates a method for detecting, for a vehicle, a utilization of an electronic device by a driver of the vehicle, according to an example embodiment of the present invention.

DETAILED DESCRIPTION

Figure 1:
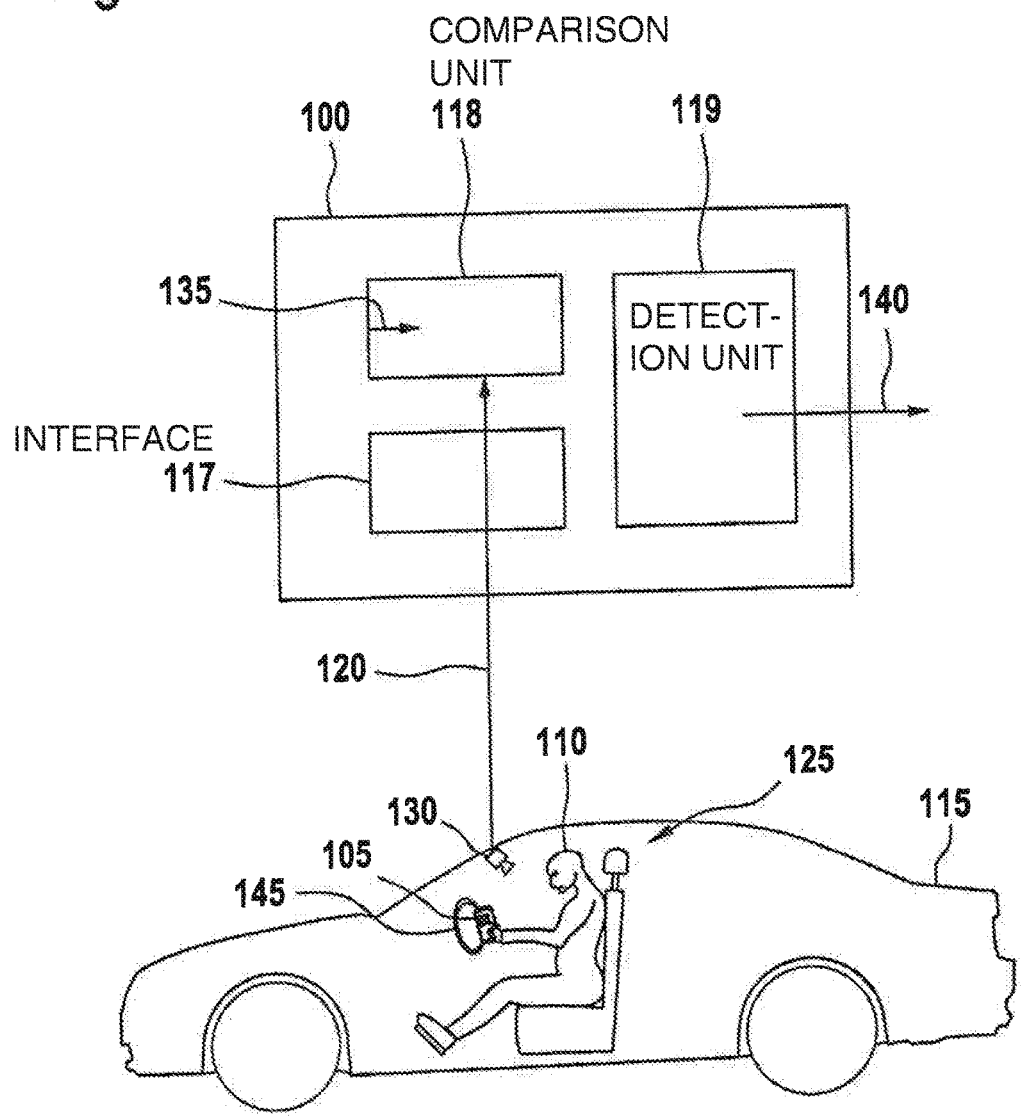
FIG. 1 schematically depicts an apparatus for detecting, for a vehicle, a utilization of an electronic device by a driver of the vehicle, according to an example embodiment of the present invention.

In the description below of favorable exemplifying embodiments of the present approach, identical or similar reference characters are used for those elements that are depicted in the various Figures which function similarly, repeated description of those elements being omitted.

FIG. 1 schematically depicts an apparatus 100 for detecting a utilization of an electronic device 105 by a driver 110 of a vehicle 115, according to an example embodiment.

Apparatus 100 has an interface 117, a comparison unit 118, and a detection unit 119. Interface 117 is configured to read in at least one sensor signal 120 that represents at least one current parameter 125 of electronic device 105 and/or of driver 110 in vehicle 115. Comparison unit 118 is configured to compare sensor signal 120 with at least one stored utilization signal 135 that represents the utilization of electronic device 105 by driver 110 while driving vehicle 115. Detection device 119 is configured to output a detection signal 140 if a predefined correlation exists between sensor signal 120 and utilization signal 135, in order to indicate a detected utilization of electronic device 105.

According to this exemplifying embodiment, interface 117 is configured to read in sensor signal 120 as an image signal furnished by a vehicle camera 130. According to this exemplifying embodiment, parameter 125 read in by way of the image signal represents an inclined head posture of driver 110 in vehicle 115. According to this exemplifying embodiment, utilization signal 135 is stored in evaluation unit 118 in the form of an image signal of inclined head posture 125. According to this exemplifying embodiment, detection signal 140 is outputted because sensor signal 120 conforms, within a tolerance range, to utilization signal 135.

An autonomous vehicle 115 is a vehicle 115 that does not require a driver 110. Vehicle 115 drives autonomously, i.e., in partly or highly automated fashion, for example by independently recognizing a road profile, other traffic participants, and/or obstacles, and calculating corresponding control instructions in vehicle 115 and conveying them to actuators in vehicle 115 with the result that the trajectory of vehicle 115 is correctly influenced. In a fully autonomous vehicle 115, driver 110 is not involved in driving events. Currently available vehicles 115 are not yet capable of acting autonomously, on the one hand because the corresponding technology is not yet fully mature, and on the other hand because legislation stipulates that the vehicle driver, i.e., driver 110, must be able to participate at any time in driving events. Systems that represent autonomous or partly autonomous driving do, however, already exist. These systems are in an intensive testing phase. Even today, it is foreseeable that fully autonomous vehicle systems will come onto the market in a few years, as soon as the aforementioned impediments have been overcome.

Car-to-X Communication

"Car-to-X communication," abbreviated "Car2Car" or "C2C," is understood to mean an exchange of information and data between motor vehicles 115. The purpose of this data exchange is to inform driver 110 promptly of critical and hazardous situations. Vehicle-specific data can also be exchanged via an interface between vehicles 115. The relevant vehicles 115 collect data, such as ABS interventions, steering angle, position, direction, and speed, and transmit those data via radio, e.g., via WLAN or UMTS, to other vehicles 115 of other traffic participants. The intention is to extend the "visual range" of driver 110 using electronics. "Car-to-infrastructure," abbreviated "C2I," is understood to mean the exchange of data between a vehicle 115 and a surrounding infrastructure, e.g., traffic lights. The aforesaid technologies are based on the interaction of sensors of the various traffic partners, and use the latest methods of communication technology to exchange this information.

The approach presented here describes an apparatus 100 for detecting, for example, mobile telephone utilization in vehicle 115, with subsequent initiation of countermeasures in vehicle 115 with the objective of enhancing traffic safety. Recognition of parameter 125, in the form of a position of driver 110 in vehicle 115, is helpful in terms of detecting mobile telephone utilization. The position of driver 110 can be ascertained in this context using a variety of methods, such as, for example by way of: (a) a fatigue detection system already installed in vehicle 115, (b) vehicle camera 130 installed according to this exemplifying embodiment in the interior of vehicle 115, which can be a mono and/or stereo camera, (c) ultrasonic sensors installed in the interior of vehicle 115, (d) three-dimensional laser scanners installed in the interior of vehicle 115, (e) seat sensors installed in the interior of vehicle 115, and/or (f) at least one further sensor, for example a radar sensor, installed in the vehicle interior.

The fatigue detection system in (a), already installed in vehicle 115 according to an alternative exemplifying embodiment, can be used to monitor a gaze direction of driver 110 in vehicle 115. For example, if driver 110 is constantly looking down and if only one of his or her hands is disposed on steering wheel 145, this is an indication that driver 110 is utilizing an electronic device 105 in vehicle 115. The further methods in (b)-(f) function similarly. Here as well, the position of driver 110 and his or her gaze direction and/or hand movements are captured and monitored over time and, for example, mobile telephone utilization in vehicle 115 by driver 110 is thereby ascertained. The seat sensors installed according to an alternative exemplifying embodiment in vehicle 115 can be used in supplementary fashion in (e) in order to ascertain a posture of driver 110 in vehicle 115. For example, if driver 110 is in a bent-over body posture, this is likewise an indication that driver 110 is utilizing a device 105 in vehicle 115.

Beyond methods (a)-(f), detection of the utilization of a device 110 in the form of, for example, mobile telephone utilization can furthermore be accomplished according to alternative exemplifying embodiments in alternative ways, such as, for example by way of: (g) a radio-based and/or wire-based coupling apparatus between device 105 and vehicle 115 and/or (h) sensors installed in device 105, for example a camera and/or acceleration sensors.

In the case of the wire-based coupling apparatus in (g), device 105, for example a mobile telephone, is disposed in the coupling apparatus, with the result that a wire-based connection exists between device 105 and further vehicle components, for example a charging apparatus. If driver 110 removes device 105 from the coupling apparatus, this is recognized by a vehicle electronic system and interpreted as a utilization of device 105. In the case of the radio-based coupling apparatus, detection of utilization is accomplished thanks to a radio-based distance measurement between device 105 and the coupling apparatus. This distance measurement can be accomplished, for example, via NFC, Bluetooth, or other radio signals; inter alia, the transit time of the signals can be employed. If driver 110 removes device 105 from the coupling apparatus, this is recognized by a vehicle electronic system and interpreted as utilization of device 105.

Lastly, in (h), sensors installed in device 105, such as a camera, acceleration sensors, and/or rotation rate sensors, are used to detect utilization of device 105 by driver 110 while driving. For this, device 105 exchanges sensor data with vehicle 115, for example via a cable connection and/or radio connection. Vehicle 115 then evaluates those sensor data. In the case of the camera, the image data are evaluated, with the result that, for example, a frontal gaze by the driver toward device 105 is recognized. This is then an indication of device utilization. By way of the data of the acceleration sensors and/or rotation rate sensors of device 105, on the one hand removal of device 105 from the coupling apparatus can be ascertained, as well as the relative position of device 105. For example, if device 105 is located vertically in the coupling apparatus it can be assumed that it is not being utilized. If device 105 is being operated by driver 110, however, it is then in an oblique position. This is recognized by vehicle 115 with the aid of the sensor signals of device 105, and utilization of device 105 is deduced therefrom Method (h) has the substantial advantage that no further sensors from (a)-(f) need to be installed in vehicle 115.

In a further embodiment of the invention, the detection of utilization of device 105 in step (h) is accomplished in device 105 itself. Only an exchange between device 105 and vehicle 115 of a detected device utilization then occurs, and not, as described previously, an exchange of raw sensor data. A combination of the methods in (a)-(h) for the detection of device utilization in vehicle 115 is also conceivable by way of the approach.

According to a further alternative exemplifying embodiment, a report of the detection of device utilization by driver 110 while driving is made, in response to detection signal 140, to authorities, for example to the police, for example together with further data such as date, time, vehicle owner, speed. These data are then further processed by the authorities and, for example, a citation is issued. A car-to-infrastructure communication interface installed in vehicle 115 can be employed, for example, for transmission of the data between vehicle 115 and the authorities.

In a further alternative exemplifying embodiment of apparatus 100, in response to detection signal 140, a warning is given to driver 110 of vehicle 115 to discontinue device utilization while driving. This warning is outputted, for example acoustically or visually, for a specific time. If driver 110 discontinues device utilization, then initially nothing happens. If driver 110 continues to use device 105, the above-described report to the authorities is made.

In a further alternative exemplifying embodiment of apparatus 100, detection of mobile telephone utilization occurs only when vehicle 115 is in manual mode and is actively being controlled by driver 110. If vehicle 115 is in the highly or partly autonomous operating mode, detection of device utilization is deactivated until driver 110 is once again actively controlling vehicle 115.

According to a further alternative exemplifying embodiment, a deactivation of device 105 occurs in response to detection signal 140 if said device is removed from the coupling apparatus by driver 110 while driving. Deactivation of device 105 is accomplished, for example, with the aid of radio connections such as NFC or Bluetooth between the vehicle electronics and device 105. Driver 110 thus has no possibility of utilizing device 105 while driving according to this example embodiment.

According to a further alternative exemplifying embodiment, in vehicle 115 that is drivable in highly automated or partly automated fashion, a switchover into the highly automated or partly automated driving mode of vehicle 115 occurs automatically in response to detected signal 140, if vehicle 115 was previously in the manual driving mode. For example, a call can be answered by driver 110, whereupon vehicle 115 is thereafter driven in highly automated or partly automated fashion and no longer needs to be actively controlled by driver 110. After completion of the call, driver 110 can once again control vehicle 115 in the manual driving mode, provided no further utilization of device 105 has been recognized by apparatus 100.

In summary, the substantial advantage of the approach is the appreciable enhancement of traffic safety, since in accordance with one of the aforesaid exemplifying embodiments, driver 110 can still utilize device 105 in vehicle 115 but automatically receives, for example, warnings or even citations. Utilization of device 105 while driving in a highly automated or partly automated vehicle 115 is furthermore enabled only if vehicle 115 is not in the manual driving mode. In a further one of the aforesaid exemplifying embodiments, driver 110 no longer has a capability of using device 105 while driving because it is automatically deactivated upon removal from the coupling apparatus. If driver 110 of vehicle 115 wishes to utilize his or her device 105 in the context of the approach, he or she must firstly bring his or her manually controlled vehicle 115 to a stop, since any device utilization while driving is recognized by apparatus 100 and corresponding counter-measures are initiated. In highly automated or partly automated vehicle 115, automatic switchover from the manual into the partly automated or highly automated driving mode upon detection of device utilization is a further substantial advantage of the approach according to one of the described example embodiments.

FIG. 2 is a flowchart of a method 200 for detecting utilization of an electronic device by a driver, for a vehicle, according to an exemplifying embodiment. This method 200 can be one that can be executed by apparatus 100 described with reference to FIG. 1. In a reading-in step 205, at least one sensor signal is read in via an interface from a sensor disposed in the vehicle. The sensor signal represents at least one current parameter of the electronic device and/or of the driver in the vehicle. In a comparing step 210, the sensor signal is compared with at least one stored utilization signal that represents the utilization of the electronic device by the driver while driving the vehicle. In an outputting step 215, a detection signal is outputted if a predetermined correlation exists between the sensor signal and the utilization signal, in order to indicate a detected utilization of the electronic device.

Method 200 according to this exemplifying embodiment optionally also has a recognizing step 220, a creating step 225, a generating step 230, and a deactivating step 235. In recognizing step 220, a manual operating mode signal that represents a manual operating mode of the vehicle is recognized, the reading-in step 205 being executed in response to the recognizing step 220. In creating step 225, an acoustic and/or optical warning signal is created in response to the detection signal. In generating step 230 an automatic operating mode signal, for transferring the vehicle into a partly or highly automated driving mode, is generated in response to the detection signal. In deactivating step 235, a deactivation signal is outputted in response to the detection signal in order to deactivate the device. Also conceivable is execution of a step, not explicitly depicted in FIG. 2, of reporting to an authority that utilization of the electronic device has been detected.

If an exemplifying embodiment encompasses an "and/or" relationship between a first feature and a second feature, this is to be read to mean that the exemplifying embodiment according to one embodiment has both the first feature and the second feature, and according to a further embodiment has either only the first feature or only the second feature.

What is claimed is:

1. A method for detecting a utilization of an electronic device by a driver of a vehicle, the method comprising:
    obtaining, by processing circuitry and from a sensor disposed in the vehicle, at least one sensor signal representing at least one current parameter of at least one of the electronic device and the driver in the vehicle;
    comparing, by the processing circuitry, the sensor signal with at least one stored utilization signal that represents the utilization of the electronic device by the driver while driving the vehicle;
    outputting, by the processing circuitry, a detection signal that indicates the utilization of the electronic device in response to a determination, based on the comparing, that a predetermined correlation exists between the sensor signal and the utilization signal; and
    suppressing operation of the electronic device being operated by the driver to improve driving safety;
    wherein the obtained signal represents at least one of a position of the driver in the vehicle, a gaze direction of the driver in the vehicle, and a hand movement of the driver in the vehicle,
    wherein the position of the driver, the gaze direction of the driver and/or hand movements of the driver are captured and monitored over time to determine whether the driver is using the electronic device in the vehicle, and
    wherein operation of the electronic device is suppressed by deactivating the electronic device by disconnecting radio connections, including NFC or Bluetooth connections, between vehicle electronics and the electronic device.

2. The method of claim 1, wherein the correlation is determined to exit when the sensor signal conforms to the utilization signal within a tolerance range.

3. The method of claim 1, wherein the obtaining includes reading in the sensor signal as at least one of a camera signal furnished by a vehicle camera, an ultrasonic signal furnished by an ultrasonic sensor, a laser signal, and a radar signal furnished by a radar sensor.

4. The method of claim 1, wherein the obtaining includes reading in the sensor signal as a three-dimensional laser image signal furnished by a laser scanner.

5. The method of claim 1, wherein, in the comparing, the stored utilization signal is compared as at least one of an image signal, an ultrasonic image signal, a laser image signal, and a radar signal.

6. The method of claim 1, wherein, in the comparing, the stored utilization signal is compared as a three-dimensional laser image signal.

7. The method of claim 1, wherein the obtained sensor signal is read in as a seat signal furnished by a seat sensor.

8. The method of claim 1, wherein the obtained sensor signal includes a parameter that represents a posture of the driver on a seat.

9. The method of claim 1, wherein, in the comparing, the stored utilization signal is compared as a posture image signal.

10. The method of claim 1, wherein the obtaining includes reading in the sensor signal as a coupling signal furnished by a coupling device.

11. The method of claim 1, wherein the obtaining includes reading in the sensor signal as a parameter that represents at least one of a radio-based and wired coupling connection of the electronic device to at least one component of the vehicle in the vehicle.

12. The method of claim 1, wherein in the comparing, the stored utilization signal is compared as at least one of a disconnected radio-based and wired coupling connection of the electronic device to the component of the vehicle in the vehicle.

13. The method of claim 1, wherein the obtaining includes reading-in the sensor signal as at least one of a device signal furnished by a device sensor of the electronic device and a parameter that represents at least one of a movement, an acceleration, and a rotation rate of the electronic device in the vehicle.

14. The method of claim 1, wherein the outputting is to a receiver unit external to the vehicle.

15. The method of claim 1, wherein at least one of an acoustic and optical warning signal is created in response to the detection signal in order to warn the driver.

16. The method of claim 1, wherein an automatic operating mode signal for transferring the vehicle into an automated driving mode is generated in response to the detection signal.

17. The method of claim 1, further comprising recognizing a manual operating mode signal which represents a manual driving mode of the vehicle, wherein the obtaining is performed in response to the recognition.

18. The method of claim 1, wherein a deactivation signal for deactivating the electronic device is output in response to the detection signal.

19. A non-transitory computer-readable medium on which are stored instructions that are executable by a processor and that, when executed by the processor, cause the processor to perform a method for detecting a utilization of an electronic device by a driver of a vehicle, the method comprising:

obtaining from a sensor disposed in the vehicle at least one sensor signal representing at least one current parameter of at least one of the electronic device and the driver in the vehicle;

comparing the sensor signal with at least one stored utilization signal that represents the utilization of the electronic device by the driver while driving the vehicle;

outputting a detection signal that indicates the utilization of the electronic device in response to a determination, based on the comparing, that a predetermined correlation exists between the sensor signal and the utilization signal; and suppressing operation of the electronic device being operated by the driver to improve driving safety;

wherein the obtained signal represents at least one of a position of the driver in the vehicle, a gaze direction of the driver in the vehicle, and a hand movement of the driver in the vehicle, wherein the position of the driver, the gaze direction of the driver and/or hand movements of the driver are captured and monitored over time to determine whether the driver is using the electronic device in the vehicle, and wherein operation of the electronic device is suppressed by deactivating the electronic device by disconnecting radio connections, including NFC or Bluetooth connections, between vehicle electronics and the electronic device.

20. A device for detecting a utilization of an electronic device by a driver of a vehicle, the device comprising:

an interface; and processing circuitry, wherein the processing circuitry is configured to perform the following:

obtain from a sensor disposed in the vehicle, and via the interface, at least one sensor signal representing at least one current parameter of at least one of the electronic device and the driver in the vehicle;

compare the sensor signal with at least one stored utilization signal that represents the utilization of the electronic device by the driver while driving the vehicle;

output a detection signal that indicates the utilization of the electronic device in response to a determination, based on the comparison, that a predetermined correlation exists between the sensor signal and the utilization signal; and suppressing operation of the electronic device being operated by the driver to improve driving safety;

wherein the obtained signal represents at least one of a position of the driver in the vehicle, a gaze direction of the driver in the vehicle, and a hand movement of the driver in the vehicle, wherein the position of the driver, the gaze direction of the driver and/or hand movements of the driver are captured and monitored over time to determine whether the driver is using the electronic device in the vehicle, and wherein operation of the electronic device is suppressed by deactivating the electronic device by disconnecting radio connections, including NFC or Bluetooth connections, between vehicle electronics and the electronic device.

* * * * *